(12) United States Patent
Martin et al.

(10) Patent No.: US 8,822,565 B2
(45) Date of Patent: Sep. 2, 2014

(54) AQUEOUS SILICONE DISPERSIONS, FORMULATIONS, ESPECIALLY PAINT FORMULATIONS, CONTAINING THEM AND ONE OF THEIR METHODS OF PREPARATION

(75) Inventors: Nadia Martin, Lyons (FR); Martial Deruelle, Millery (FR); Patricia Beurdeley, Aubervilliers (FR)

(73) Assignee: Bluestar Silicones France SAS, Lyons (FR)

( * ) Notice: Subject to any disclaimer, the term of this patent is extended or adjusted under 35 U.S.C. 154(b) by 0 days.

(21) Appl. No.: 13/073,384

(22) Filed: Mar. 28, 2011

(65) Prior Publication Data

US 2011/0190415 A1 Aug. 4, 2011

Related U.S. Application Data

(63) Continuation of application No. 11/815,742, filed as application No. PCT/FR2006/000189 on Jan. 27, 2006, now abandoned.

(30) Foreign Application Priority Data

Feb. 7, 2005 (FR) ........................ 05 01194

(51) Int. Cl.
*C08K 5/16* (2006.01)
*C08K 5/42* (2006.01)
*C08K 5/053* (2006.01)
*C08L 83/07* (2006.01)
*C09D 183/04* (2006.01)
*C08J 3/03* (2006.01)
*C08L 83/06* (2006.01)
*C08K 5/544* (2006.01)

(52) U.S. Cl.
CPC ............... *C08J 3/03* (2013.01); *C09D 183/04* (2013.01); *C08L 83/06* (2013.01); *C08J 2383/04* (2013.01); *C08K 5/544* (2013.01)
USPC .......... 523/122; 524/166; 524/413; 524/423; 524/425; 524/451; 524/860; 524/864

(58) Field of Classification Search
USPC .......... 523/122; 524/860, 864, 166, 413, 423, 524/425, 451
See application file for complete search history.

(56) References Cited

U.S. PATENT DOCUMENTS

| | | | | |
|---|---|---|---|---|
| 2,891,920 | A * | 6/1959 | Hyde et al. | 524/714 |
| 6,995,210 | B2 | 2/2006 | Bouvy | |
| 2004/0054070 | A1 * | 3/2004 | Bouvy et al. | 524/588 |
| 2004/0109853 | A1 * | 6/2004 | McDaniel | 424/94.6 |
| 2005/0037210 | A1 * | 2/2005 | Bertry et al. | 428/447 |

FOREIGN PATENT DOCUMENTS

| | | |
|---|---|---|
| CA | 2136491 | 1/1999 |
| EP | 0655475 | 2/1997 |
| FR | 2771098 | 5/1999 |
| FR | 2810989 | 1/2002 |
| WO | WO 0059992 A1 * | 10/2000 |

OTHER PUBLICATIONS

"International Search Report," International Patent Application No. PCT/FR06/00189 (May 16, 2006).

* cited by examiner

*Primary Examiner* — Kriellion Sanders
(74) *Attorney, Agent, or Firm* — Miles & Stockbridge, P.C.

(57) ABSTRACT

The invention relates to an aqueous silicone dispersion, containing one or more polyorganosiloxanes (POSs) intended to be crosslinked or having been crosslinked by elimination of water or alcohol, according to a polycondensation mechanism. The present invention also relates to methods for preparing aqueous silicone emulsions and dispersions.

21 Claims, No Drawings

AQUEOUS SILICONE DISPERSIONS, FORMULATIONS, ESPECIALLY PAINT FORMULATIONS, CONTAINING THEM AND ONE OF THEIR METHODS OF PREPARATION

CROSS-REFERENCE TO RELATED APPLICATIONS

This is a continuation of U.S. patent application Ser. No. 11/815,742, filed Aug. 7, 2007, now abandoned, which is a §371 National Stage Application of PCT/FR2006/000189, filed Jan. 27, 2006, which claims priority to FR0501194, filed Feb. 7, 2005.

The present invention relates to novel coating compositions, especially exterior and interior paint compositions. These compositions may be used in various applications such as water-based paint, casting products, lazure paints, impregnations, semi-thick coating (STC) or paints for facades.

The prior art does not indicate any coating composition that is capable of being correctly and adequately crosslinked by condensation, into an elastomer or a crosslinked product, which gives the final application, for example in the form of paint, an increased wet scrub resistance (WSR), a beading effect and a water impermeability that are satisfactory.

One of the main objects of the present invention is therefore to provide a novel aqueous silicone coating dispersion giving the final application an effective waterproofing, that is to say an increased wet scrub resistance (WSR), a water impermeability, a water vapor permeability and a beading effect which are satisfactory.

More specifically, the invention relates to an aqueous siliconedispersion, containing one or more polyorganosiloxanes (POSs) intended to be crosslinked or having been crosslinked by elimination of water or alcohol, according to the polycondensation mechanism taking place, advantageously, at ambient temperature.

The present invention also relates to one method amongst others for preparing aqueous silicone emulsions and dispersions, especially of the type of those according to the invention.

Market demand for formulations of the type mentioned above for environmentally friendly products, which are nontoxic or have low toxicity (especially containing no volatile organic solvent) and are convenient and easy to use (e.g. easy washing of tools) has encouraged producers to develop aqueous dispersions/emulsions that advantageously can replace solutions and dispersions of organic polymer binders and/or of silicones in solvents or volatile organic compounds (VOCs).

Thus, aqueous silicone emulsions have appeared that are intended to be used as raw materials in the manufacture of paints, STCs or mastics, and containing one or more silicone oils that can be crosslinked into elastomers by condensation. The aim of such emulsions is to completely or partly substitute the organic polymer binders conventionally employed to date, especially in paints.

The technical difficulties encountered in the production of these aqueous silicone emulsions are numerous. It is possible to distinguish among them a first category, common to all the intended final applications, and a second category more specific to paints and STCs.

Regarding the first category, mention should firstly be made of the storage stability of these oil-in-water (O/W) emulsions. It is clear that an undesirable phase change of the aqueous silicone emulsion is completely unacceptable in the applications.

It is also necessary to pay great attention to safety and toxicity problems. This is because, even if these are relatively minor owing to the use of water as a dispersion medium, the fact remains that harmful products (VOCs) may be generated in situ by hydrolysis.

Furthermore, the curing time of the silicones of the emulsion must not be too long after application. In addition, the crosslinked product or elastomer which forms must have suitable mechanical properties (hardness, elasticity, abrasion resistance) adapted to the application in question.

It goes without saying that the aqueous silicone emulsion or the products prepared from this must be easy to use.

Finally, it is important, regardless of the intended use, that the material obtained after application (film, coating, seal, filler) adheres perfectly to the support onto which it is applied.

Regarding the second category of difficulties specific to paints and STCs, it must be stressed that the stability of the paint emulsions is even more crucial.

Furthermore, a paint must be easy to apply in the form of a film by known means: by brush, roller, spraying, immersion, etc.

In addition, it is vital that the paints and also the polymer binders that they contain, in particular the silicones, crosslink correctly so as to produce a hard elastomer film. In other words, this film must not be tacky, so as to prevent dust from sticking to it. Imperfect curing of the paint film also has the deleterious repercussion of reducing its durability and its resistance to external environmental or biological attack.

There is also a demand for paints to be impermeable to water coming from outside and permeable to water vapor of internal origin.

In summary, the specifications demanded of paints based on aqueous silicone emulsions are:
- environmentally friendly nature (safety, nontoxicity);
- high binding power and strong cohesion (high WSR);
- hardness synonymous with durability and clean and non-tacky appearance;
- water vapor permeability;
- water repellency, low liquid water absorption; and
- beading effect.

In more concrete terms, the novel aqueous silicone dispersion, that can be used especially in the formulation of paints, developed and being the subject of the present invention, is mainly composed of:
a) at least one polyorganosiloxane resin (A) comprising condensable hydroxyl substituents present in an amount of at least 0.05% by weight;
b) at least one epoxy-functionalized polyorganosiloxane (B);
c) at least one water-soluble hydroxylated alkylaminosilane (C) present in its monomeric form of general formula (I) and/or in a condensed oligomeric type form:

$$R^1-[Si]-[OH]_3 \qquad (I)$$

in which formula:
— $R^1$ is an aminoalkyl radical having 1 to 6 carbon atoms or a group of general formula: $H_2N-(CH_2)_n R^2-(CH_2)_z-$; with $R^2$ representing O, S, —NH— or NH—$CH_2$—$CH_2$—NH— and $x \geq 2$, $z \geq 2$;
d) at least one surfactant (S);
e) optionally at least one biocide (D);
f) water; and
g) optionally an effective amount of a polycondensation catalyst;

said aqueous silicone dispersion not containing any silane having hydrolyzable functional groups of alkoxy —OR type with R being a $C_1$-$C_{20}$ aliphatic hydrocarbon group.

The catalyst is preferably a catalytic tin compound, generally an organotin salt, preferably introduced in the form of an aqueous emulsion. The organotin salts that can be used are described, in particular, in the work by Noll, Chemistry and Technology of Silicones, Academic Press (1968), page 337.

It is also possible to use, as a catalytic tin compound, either distannoxanes, or polyorganostannoxanes, or the reaction product of a tin salt, in particular of a tin dicarboxylate with ethyl polysilicate, as described in U.S. Pat. No. 3,862,919.

The reaction product of an alkyl silicate or of an alkyl trialkoxysilane with dibutyltin diacetate, as described in the Belgian Patent BE-A-842 305, may also be suitable.

According to another possibility, a tin II salt can be used, such as $SnCl_2$ or stannous octoate.

The preferred tin salts are tin bischelates (EP-A-147 323 and EP-A-235 049), diorganotin dicarboxylates and, in particular, dibutyltin or dioctyltin diversatates (British Patent GB-A-1 289 900), dibutyltin or dioctyltin diacetate, dibutyltin or dioctyltin dilaurate or the hydrolysis products of the aforementioned species (e.g. the diorganostannoxanes and polystannoxanes).

According to one particularly advantageous mode, the aqueous silicone dispersion according to the invention does not have a polycondensation catalyst and is mainly composed of:
a) at least one polyorganosiloxane resin (A) comprising condensable hydroxyl substituents present in an amount of at least 0.05% by weight;
b) at least one epoxy-functionalized polyorganosiloxane (B);
c) at least one water-soluble hydroxylated alkylaminosilane (C) present in its monomeric form of general formula (I) and/or in a condensed oligomeric type form:

$$R^1\text{—[Si]—[OH]}_3 \qquad (I)$$

in which formula:
—$R^1$ is an aminoalkyl radical having 1 to 6 carbon atoms or a group of general formula: $H_2N$—$(CH_2)_x R^2$—$(CH_2)_z$—; with $R^2$ representing O, S, —NH— or NH—$CH_2$—$CH_2$—NH— and $x \geq 2$, $z \geq 2$;
d) at least one surfactant (S);
e) optionally at least one biocide (D); and
f) water;
said aqueous silicone dispersion not containing any silane having hydrolyzable functional groups of alkoxy —OR type with R being a $C_1$-$C_{20}$ aliphatic hydrocarbon group.

a polyorganosiloxane resin having hydroxyl functional groups and with an epoxy-functionalized polyorganosiloxane.

Contrary to all expectations, it appears that this dispersion is durably stable and that it satisfies the assigned objectives of improving the WSR, of ease of preparation and of use, of selective barrier to exchanges of water in liquid form or vapor form, of safety/nontoxicity and of improving the beading effect of the paint based on this dispersion.

Moreover, it is particularly surprising to notice that after curing/crosslinking the dispersion is still film forming. Indeed, not withstanding their crosslinked state and their increased molecular weight, it is observed that as a film is formed, that the droplets of resin (A) coalesce and that the dispersion dries.

Crosslinking in an emulsion—a feature of the invention—makes it possible to increase, in situ, the average molecular weight of the resin (A) and its viscosity. Before its crosslinking, the hydroxylated resin (A) has a sufficiently low weight-average molecular weight $M_w$ and therefore, in fact, a sufficiently low viscosity in order to be able to be emulsified. It is not necessary to first dilute this resin in a solvent in order to be able to emulsify it according to conventional procedures.

Consequently, this dispersion according to the invention comprises, after crosslinking, a silicone crosslinked product or elastomer that has improved mechanical properties (especially abrasion resistance), without using toxic and dangerous solvents.

The constituents (A), (B), (C), (S) and (D) of the dispersion are defined in the present text through their initial chemical structure, that is to say the structure that characterizes them before emulsification. This is because, from the moment that they are in an aqueous medium, they are converted by hydrolysis/condensation and their structure then becomes difficult to define.

The main constituent of the dispersion on the basis of weight is the polyorganosiloxane resin (A). The hydroxyl groups of this resin are preferentially borne by the T units, but a hydroxyl substitution of the M and/or D and/or optionally Q units is not excluded. The level of hydroxylation is expressed in % by weight. According to this mode of expression, the minimum hydroxylation is, preferably, equal to 0.05%. In practice, it is greater than or equal to 0.3% and more preferably still between 0.5% and 3%.

In any case, it is advisable that this level of hydroxylation is sufficient to guarantee correct crosslinking that conforms to the expected level.

It is recalled that in the terminology of silicone chemistry, the siloxane units M, D, T and Q are defined as follows:

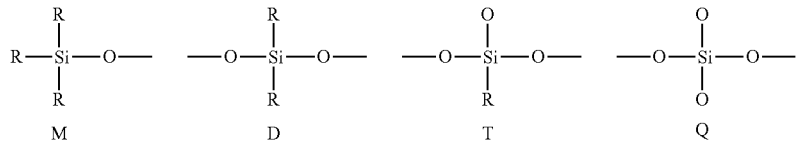

According to one preferred mode of the invention, the aqueous dispersion is in the form of an oil-in-water emulsion.

The problem of improving the mechanical and rheological characteristics of the paints containing this type of emulsions has been solved by the Inventors, who did very well to understand that the solution occurred by the selection of a hydroxylated and water-soluble aminosilane not having functional groups alkoxylated by organic alkyl radicals, combined with The resins that are more particularly chosen are those of the type T(OH), DT(OH), DQ(OH), DT(OH), MQ(OH), MDT(OH), MDQ(OH) or mixtures thereof. In these resins, each OH group is borne by a silicon atom belonging to a D, T or Q unit.

These resins are products of condensation (monocondensation or polycondensation, heterocondensation or homocondensation) of monomers, oligomers, or POS polymers bearing condensable groups, preferably of hydroxyl type.

Preferably, the polyorganosiloxane resin (A) comprises, before emulsification:

condensable hydroxyl substituents present in an amount of at least 0.05% by weight; and D, T and optionally M and/or Q siloxyl units, the T siloxyl units being present in a molar % between 50 and 85% and preferably between 55 and 80%.

According to one particularly advantageous embodiment, the polyorganosiloxane resin (A) is a liquid polyorganosiloxane resin of T(OH), DT(OH), DQ(OH), DT(OH), MQ(OH), MDT(OH), MDQ(OH) type or mixtures thereof, and preferably MDT(OH), DT(OH) or mixtures thereof.

All the viscosities in question in the present text correspond to an order of dynamic viscosity at 25° C. said to be "Newtonian", that is to say the dynamic viscosity is measured, in a manner known per se, at a low enough shear rate so that the viscosity measured is independent of the shear rate.

According to one preferred variant of the invention, the water-soluble hydroxylated alkylaminosilane (C) is aminopropyltrihydroxysilane.

According to one preferred mode of the invention, the water-soluble hydroxylated alkylaminosilane (C) is present up to 15% by weight relative to the total weight of the dispersion, preferably present up to 10% and even more preferably between 0.5 and 7% by weight.

The epoxy-functionalized polyorganosiloxane (B) of the aqueous silicone dispersion according to the invention comprises at least one epoxy-functional radical Y, linked to the silicon via a divalent radical containing from 2 to 20 carbon atoms and possibly containing at least one heteroatom, preferably oxygen, bearing at least one epoxy unit, Y preferably being chosen from the following radicals:

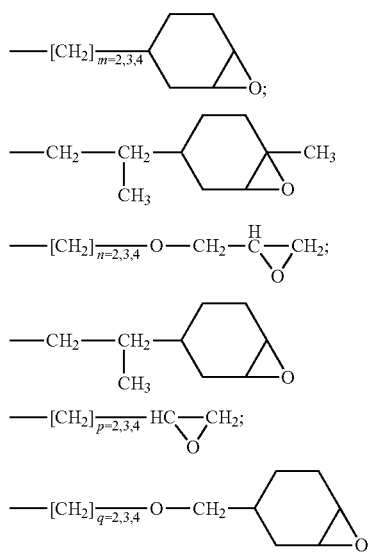

According to one preferred mode of the invention, the epoxy-functionalized polyorganosiloxane (B) is composed of units of formula (V) and terminated by units of formula (VI) and/or composed of units of formula (V) represented below:

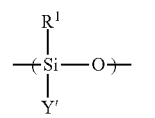

(V)

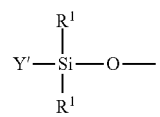

(VI)

in which:

the $R^1$ symbols are the same or different and represent:
a linear or branched alkyl radical containing 1 to 8 carbon atoms, the alkyl radicals preferably being methyl, ethyl propyl and octyl;
an optionally substituted cycloalkyl radical containing between 5 and 8 cyclic carbon atoms;
an aryl radical containing between 6 and 12 carbon atoms which may be substituted, preferably a phenyl or dichlorophenyl radical;
an arylalkyl part having an alkyl part containing between 5 and 14 carbon atoms and an aryl part containing between 6 and 12 carbon atoms, optionally substituted on the aryl part by halogens, alkyl groups and/or alkoxy groups containing 1 to 3 carbon atoms;

the Y' symbols are the same or different and represent:
the group $R^1$; and/or
an epoxy-functional group, linked to the silicon of the polyorganosiloxane via a divalent radical containing from 2 to 20 carbon atoms and which may contain at least one heteroatom, preferably oxygen; and
at least one of the Y' symbols representing an epoxy-functional group.

According to one preferred mode of the invention, the organofunctional groups Y' of the epoxy type are chosen from the following formulae:

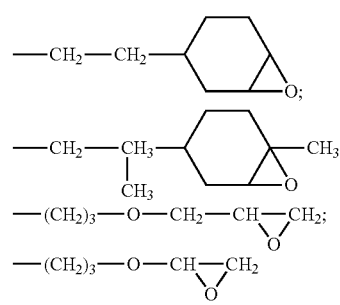

The epoxy-functionalized polyorganosiloxane (B) may be either linear or cyclic.

When they are cyclic polyorganosiloxanes, these are composed of units (II) which may be, for example, of the dialkylsiloxy or alkylarylsiloxy type. These cyclic polyorganosiloxanes have a viscosity of around 1 to 5000 mPa·s.

The production of such functionalized polyorganosiloxanes is perfectly within the reach of a person skilled in the art of silicone chemistry.

When a surfactant (S) is used in the dispersion according to the invention, it is preferably a nonionic surfactant.

In the context of the present invention, anionic surfactants may optionally be used. By way of example, mention may be made of the alkali metal salts of sulfonic or alkylsulfuric aromatic hydrocarbon-based acids and the preferred nonionic surfactants are polyoxyethylenated alkylphenols or polyoxyethylenated fatty alcohols.

The amount of surfactant that can be used is that commonly employed for emulsification as described, in particular, in U.S. Pat. No. 2,891,920.

The nonionic (preferably), ionic or amphoteric surfactants may be employed alone or mixed together.

In practice, the dispersion according to the invention comprises from 30 to 90%, preferably from 30 to 60% by weight of water per 70 to 10%, preferably 70 to 40%, by weight of nonaqueous phase.

A second subject of the invention relates to a method of preparing an aqueous silicone dispersion, that can be used especially in the formulation of paints, characterized in that it comprises the following essential, successive or non-successive steps:

a) preparation:
- of a premix I comprising at least one polyorganosiloxane resin (A) as defined above, and a premix II comprising at least one epoxy-functionalized polyorganosiloxane (B) as defined above; or
- a premix III comprising at least one polyorganosiloxane resin (A) as defined above and at least one epoxy-functionalized polyorganosiloxane (B) as defined above;

b) emulsification with water and in the presence of at least one surfactant (S):
- of each premix I and II obtained in step a); or
- of the premix III; and c) mixing:
- the emulsions obtained in step b) derived from the premixes I and II with at least one water-soluble hydroxylated alkylaminosilane (C) as defined above; or
- the emulsion obtained in step b) derived from the premix III with at least one water-soluble hydroxylated alkylaminosilane (C) as defined above; and d) optional curing of the dispersion derived from step c) so that crosslinking by condensation and in an emulsion of the resin takes place within the droplets of the dispersed silicone phase, in order to obtain a dispersion in the end.

A third subject of the invention relates to an aqueous formulation, which can be used especially in the formulation of paints, comprising:

an aqueous silicone dispersion as defined above, or resulting from the preparation method as defined above, said silicone dispersion being preferably present up to 150% by weight relative to the total weight of one or some of the organic dispersions (binder(s)) and even more preferably between 40 and 100% by weight;

a siliceous or nonsiliceous filler, preferably chosen from the following products: precipitated or unprecipitated silica, colloidal or powdered silica, carbonates, talc, $TiO_2$ and mixtures thereof; and at least one of the compounds listed below:
- one or more organic dispersions (binders), preferably chosen from those comprising (co)polymers of styrene and/or (meth)acrylic acid;
- one or more thickeners chosen, preferably, from acrylic cellulose thickeners, polyurethanes, natural gums and mixtures thereof;
- one or more coalescents chosen, preferably, from organic solvents and more preferably still from glycols and/or aliphatic petroleum cuts;
- one or more wetting agents or dispersants preferably chosen from phosphates and/or polyacrylics;
- one or more tension agents;
- one or more neutralizing agents;
- one or more biocides;
- one or more diluents;
- one or more plasticizers, preferably chosen from non-reactive silicone oils;
- one or more antifoaming agents; and
- one or more pigments or dyes (which are organic or mineral).

The final subject of the invention relates to a paint, characterized in that it comprises:
- the aqueous silicone dispersion according to the invention;
- the aqueous silicone dispersion obtained by implementing the method according to the invention; or
- the aqueous formulation according to the invention.

The paint according to the invention may be applied, for example, to facades in accordance with the customary techniques. By way of example, it may be applied to the surfaces by any suitable means such as by brushing, spraying, etc. The surfaces on which the coating composition according to the invention can be applied are of diverse nature: for example, metal such as aluminum, wood, cement, brick, with or without prior coating with an adhesion primer.

The following examples and tests are given by way of illustration. They make it possible especially to better understand the invention and to highlight all its advantages and to anticipate some embodiment variants.

A) Raw Materials Used

Polyorganosiloxane resin (A): hydroxylated methyl silicone resin MDTOH with a hydroxyl level of 0.7% by weight;

Epoxy-functionalized polyorganosiloxane (POS) (B):

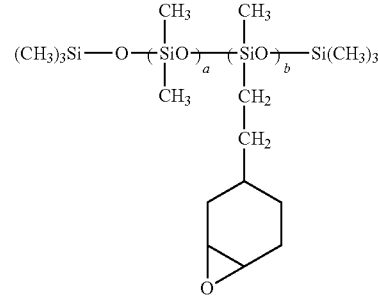

$a = 70, b = 7$ water-soluble hydroxylated alkylaminosilane (C): aqueous hydroxylate of γ-aminopropyltriethoxysilane with 20% of active material, from which the alcohol has been removed by stripping (OSI commercial product of type VS142);

silane with alkoxy group: OTES=octyltriethoxysilane;

surfactants (S): an ethoxylated (8 ethoxy units) fatty alcohol (chain of 13 carbons) sold under the tradename ROX© by Rhodia Chimie;

Catalyzing emulsion (Cat): emulsion of dioctyltin dilaurate with 35% of active tin material produced with a polyvinyl alcohol type surfactant, in this case the one sold under the trademark RHODOVIOL©; and OTES=octyltriethoxysilane.

B) Methodology for Preparing Emulsions

Several protocols for preparing dispersions can be envisaged. Without this being limiting, the protocol used in the present examples consists in:

1—mixing the water and the surfactant or surfactants (S);

2—incorporating the polyorganosiloxane resin(s) (A) and the epoxy-functionalized polyorganosiloxane (B) into this water mixture, this incorporation being carried out with stirring so as to obtain a water-in-oil emulsion;

3—carrying out the inversion of the water-in-oil (W/O) emulsion obtained in step 2 by blending (MORITZ blender) in order to eventually obtain an oil-in-water (O/W) emulsion; and 4—making the subsequent additions by mixing the silane(s).

One variant consists in mixing two emulsions in step 2, one containing the polyorganosiloxane resin (A) and the other the epoxy-functionalized polyorganosiloxane (B).

For comparative tests, the constituents used vary depending on the case.

C) Test of the Wet Scrub Resistance (WSR)

A paint applied inside or outside must be able to be cleaned easily without being degraded. For this type of product, the binding power of the polymer, that is to say its ability to ensure the cohesion of the assembly, is a determining factor.

A means of quantifying this property consists in evaluating the wet scrub resistance of a paint.

Definitions of the Wet Scrub Resistance

According to the standard ISO 11998=Loss of thickness of a paint film after a defined scrub cycle and carried out using a standard apparatus.

Principle

Evaluation of the ability of a paint film of defined thickness to resist the abrasive action exerted by the back and forth movement of a brush or of an abrasive pad in an aqueous medium.

Expression of the Results

For the Standard ISO 11998 for each test piece, apply the following formula:

$$\Delta_m \times 10^6 / (39 \times 387 \times d_s)$$

where:

$\Delta_m$ is the difference in weight of the test piece before and after the test; and $d_s$ is the dry density of the paint.

for each paint, calculate the average and the standard deviation;

express the result µm, in which corresponds to a loss of thickness of the paint film. There is a classification of paints as a function of the loss of thickness and of the number of scrub cycles:

Class 1: <5 µm after 200 cycles, for paints having a high degree of binder.

Class 2: ≥5 µm and <20 µm after 200 cycles, the paint is cleanable.

Class 3: ≥20 µm and <70 µm after 200 cycles, the paint is washable.

Class 4: <70 µm after 40 cycles.

Class 5: ≥70 µm after 40 cycles.

D) Water Permeability (W24): Standardized Test for Liquid Water Absorption

This procedure (standard NF EN 1062-3, February 1999) specifies a method for determining the liquid water permeability of paint products and similar products, applied to exterior masonry and concrete. This method can be applied to the paint products and coating systems for porous supports such as for example: bricks, concrete and render.

Principle

The coatings for exterior masonry and concrete play an important part in preventing the penetration of runoff water in the porous mineral supports. This criterion is evaluated by means of high-porosity mineral blocks where one of the faces is coated with the coating or the coating system. The test piece is immersed in water, under set conditions and the test pieces are weighed at regular time intervals. The liquid water permeability is determined by the change in mass when the change in mass is directly proportional to the square root of the time interval.

Expression of the Results

Determine the increase in the weight of water as a function of the square root of the time. The slope of the linear part of the curve is the liquid water transmission coefficient W in kg/m²·t^{1/2} in hours. To obtain the coefficient W it is necessary to divide the increase in the weight by the surface area, in m², or to divide the slope by the surface area. The surface area will be the surface area not covered by paraffin.

Normally, W is calculated for a period of 24 hours. If the part of the curve is obtained before 24 hours, the number of hours must be indicated as an index of W (e.g. $W_6$).

PVC=pigment volume capacity.

2) Procedure for the Accelerated Water Absorption Test Procedure

The water absorption is influenced by compounds that are volatile and soluble in water. In practice, these compounds may evaporate from the coating during its exposure to the outside or be washed away by rain, the coating must undergo an "accelerated" aging before the determination of its liquid water absorption (two washes instead of the three expected in the conventional procedure).

Preparation of the Test Pieces

Apply a 300 µm film of paint (two test pieces for one same paint) to a sandstone tile.

Leave to dry during the day in an air-conditioned room.

Place the test pieces, in the evening, in an oven at 30° C. and left overnight. The next morning, set the oven at 40° C. and leave the test pieces for 48 hours (2 days).

Put the test pieces in an air-conditioned room for the morning.

In the afternoon, paraffin the test pieces using a Leneta chart placed on the coating.)

Conditioning in an air-conditioned room for a minimum of one day.

Accelerated Aging

Place the sponges in a tank. Immerse them in demineralized water up to 0.5 cm below the height of the sponge. Place the test piece on the water-soaked filter. Leave the system thus for 24 h.

Dry the test piece with absorbent paper then place it in an oven at 50° C. for 24 h.

Bring the test piece back into contact with water by means of the filter/sponge for 24 h.

Dry the test piece with absorbent paper then place it in an oven at 50° C. for 24 h.

Store the test pieces in an air-conditioned room for 2 to 3 days.

Determination of the Liquid Water Absorption

After conditioning in an air-conditioned room, weigh the coated and aged test piece. Place it on the sponge wetted by means of the filter.)

After 1 h, 2 h, 3 h, 6 h and 24 h weigh the test piece, whose surface will first be dried with absorbent paper (the test piece is replaced on the sponge between each weighing).

Expression of the Results

The increase in the weight of water is a function of the square root of the time ($\Delta_{weight} = f(\sqrt{t})$).

The slope of the linear part of the curve is W, the liquid water transmission coefficient in kg/(m²·t^{1/2}). In order to obtain the coefficient W it is necessary to divide the increase in the weight by the surface area in m² of the coating or to divide the slope by the surface area.

Normally, W is calculated for a period of 24 hours. If the linear part of the curve is obtained before 24 hours, the number of hours must be indicated as an index of W (e.g. $W_6$). Plot the water absorption curve in kg/m² as a function of $\sqrt{time}$. A straight line is obtained. The slope is equal to the transmission coefficient W. For each coating studied, the average and the standard deviation of $W_{24}$ will be calculated and presented.

EXAMPLE 1

Preparation of Emulsions

TABLE 1

| Ref. | Resin | Water-soluble aminosilane compound (C) | OTES | Epoxy POS compound (B) | Catalyzing emulsion | (S)/Resin compound | Solids content* | Average D (μm) |
|---|---|---|---|---|---|---|---|---|
| Example 1 (Comp.) | 58.9 | 0 | 0 | 0 | 0 | 5% | 52.2 | 0.38 |
| Example 2 (Comp.) | 57.5 | 2.5 | 0 | 0 | 0 | 5% | 56.8 | 0.34 |
| Example 3 (Comp.) | 56.1 | 5 | 0 | 0 | 0 | 5% | 52.5 | 0.39 |
| Example 4 (Comp.) | 56.1 | 2.5 | 0 | 2.5 | 0 | 5% | 55.4 | 0.40 |
| Example 5 (Comp.) | 57.6 | 2.5 | 0 | 2.5 | 0 | 6% | 58.9 | 0.33 |
| Example 6 (Comp.) | 57.6 | 2.5 | 0 | 2.5 | 0 | 6% | 58.6 | 0.33 |
| Example 7 (Comp.) | 57.9 | 2.5 | 2.5 | 0 | 0.15 | 5% | 58.4 | 0.35 |

*as % dried in the oven (1g per 1h at 105° C)

The values in Table 1 are expressed as % by weight relative to the total weight of the emulsion.

The average diameter is measured using a Malvern Master sizer 2000/Hydro 2000G particle size analyzer.

EXAMPLE 2

Preparation of Paints

| Ref: Control paint VPC = 70% | | | | |
|---|---|---|---|---|
| | Weight | Volume | Function | Supplier |
| CONSTITUENTS | | | | |
| WATER | 22.13 | 22.13 | | |
| 10% SODIUM HEXAMETAPHOSPHATE SOL. | 0.54 | 0.50 | dispersant | |
| PROXEL GXL | 0.32 | 0.28 | bactericide | AVECIA |
| RHODOLINE DP 1130 | 0.32 | 0.25 | dispersant | RHODIA |
| RHODOLINE DF 6002 | 0.11 | 0.12 | antifoaming agent | RHODIA |
| NATROSOL 250 HR | 0.21 | 0.14 | cellulosic thickener | AQUALON |
| disperse over 15 min | | | | |
| TIONA 568 TITANIUM OXIDE | 12.98 | 3.25 | $TiO_2$ pigment | MILLENNIUM |
| OMYACARB 5-GU | 23.62 | 8.75 | $CaCO_3$ | OMYA |
| CALIBRITE SL | 9.90 | 3.60 | $CaCO_3$ | OMYA |
| LUZENAC TALC 10 MO | 3.92 | 1.41 | talc | LUZENAC |
| PLASTORIT 000 | 3.92 | 1.43 | talc | NAINTSCH |
| CELITE 281 | 2.94 | 1.28 | diatomaceous silica | CELITE |
| disperse at high speed | | | | |
| RHODOPAS DS 910 | 9.54 | 9.17 | acrylic styrene | RHODIA |
| Silicone emulsion from Example 1 | 7.94 | 7.49 | silicone emulsion | RHODIA |
| TEXANOL | 1.18 | 1.24 | coalescent | EASTMANN |
| RHODOLINE DF 6002 | 0.11 | 0.12 | antifoaming agent | RHODIA |
| RHODOLINE RH 5210 | 0.32 | 0.31 | polyurethane thickener | RHODIA |
| Total | 100.00 | 61.46 | | |
| CHARACTERISTICS OF THE PAINT: | | | | |
| Density: | 1.63 | | | |
| Solids content in weight % | 67.66 | | | |
| Solids content in volume % | 47.30 | | | |
| CHARACTERISTICS OF THE DRY FILM | | | | |
| Dry density | 2.33 | | | |
| PVC (with adjuvant) | 67.78 | | | |
| PVC (without adjuvant) | 69.33 | | | |

Evaluation of the Paints

TABLE 2

| Silicone emulsions used in the paint formulation | Standardized $W_{24}$ (kg/m² · h^{0.5}) | Standardized WSR (μm) |
|---|---|---|
| Example 1 (Comp.) | 0.10 | 30 |
| Example 2 (Comp.) | 0.08 | 12 |
| Example 3 (Comp.) | 0.16 | 10 |
| Example 7 (Comp.) | 0.09 | 10 |

TABLE 3

| Silicone emulsions used in the paint formulation | Accelerated $W_{24}$ (kg/m² · h^{0.5}) | Standardized WSR (μm) |
|---|---|---|
| Example 2 (Comp.) | 0.15 | — |
| Example 4 (Inv.) | 0.09 | — |
| Example 5 (Inv.) | 0.11 | 9 |
| Example 6 (Inv.) | 0.09 | 12 |

The results show that the dispersion according to the invention make it possible to avoid using a catalyst and an alkoxylated silane (commonly used in the aqueous silicone formulations for paint). This accordingly simplifies the formulation and the method of manufacture, which is particularly profitable from a production cost viewpoint. The dispersions according to the invention make it possible to obtain $W_{24}$ values that allow them to be classed as paints having a low liquid water permeability.

In addition, the paints according to the invention have, after application and drying, an acceptable beading effect for the desired application.

The invention claimed is:

1. A paint, comprising:
   i) an aqueous silicone dispersion consisting essentially of:
      a) at least one polyorganosiloxane resin (A) comprising condensable hydroxyl substituents present in an amount of at least 0.05% by weight, wherein the polyorganosiloxanes resin (A) is a hydroxylated methyl silicone resin, and
      wherein the polyorganosiloxane resin (A) is a liquid polyorganosiloxane resin of the type T(OH), DT(OH), DQ(OH), MQ(OH), MDT(OH), MDQ(OH), or mixtures thereof,
      wherein the siloxane units M, D, T, and Q are defined as follows, wherein R is methyl:

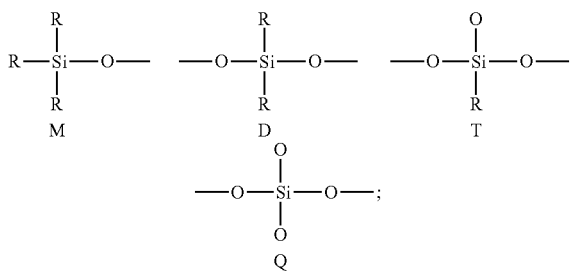

b) at least one epoxy-functionalized polyorganosiloxane (B);
      c) at least one water-soluble hydroxylated alkylaminosilane (C) present in its monomeric form of general formula (I) and/or in a condensed oligomeric type form:

in which formula:
      —$R^1$ is an aminoalkyl radical having 1 to 6 carbon atoms or a group of general formula: $H_2N$—$(CH_2)_x R^2$—$(CH_2)_z$—; with $R^2$ representing O, S, —NH— or NH—$CH_2$—$CH_2$—NH— and $x \geq 2$, $z \geq 2$;
   d) at least one surfactant (S);
   e) optionally at least one biocide (D);
   f) water; and
   g) optionally an effective amount of a polycondensation catalyst;
   wherein said aqueous silicone dispersion does not contain a silane having hydrolyzable functional groups of alkoxy —OR type with R being a $C_1$-$C_{20}$ aliphatic hydrocarbon group, said silicone dispersion present in an amount up to 150% by weight relative to the total weight of one or more organic dispersions;
   ii) a siliceous or nonsiliceous filler, selected from the group consisting of:
      precipitated silica, unprecipitated silica, colloidal or powdered silica, carbonates, talc, $TiO_2$ and mixtures thereof; and
   iii) each of compounds a), b), c), and d) listed below:
      a) one or more organic dispersions selected from the group consisting of (co)polymers of styrene and/or (meth)acrylic acid or a combination thereof;
      b) one or more thickeners selected from the group consisting of acrylic cellulose thickeners, polyurethanes, natural gums and mixtures thereof;
      c) one or more coalescents selected from the group consisting of organic solvents, glycols, aliphatic petroleum cuts and mixtures thereof;
      d) one or more wetting agents or dispersants selected from the group consisting of phosphates, polyacrylics and a combination thereof.

2. The paint comprising an aqueous silicone dispersion as claimed in claim 1, wherein the aqueous silicone dispersion consists essentially of:
   a) at least one polyorganosiloxane resin (A) comprising condensable hydroxyl substituents present in an amount of at least 0.05% by weight;
   b) at least one epoxy-functionalized polyorganosiloxane (B);
   c) at least one water-soluble hydroxylated alkylaminosilane (C) present in its monomeric form of general formula (I) and/or in a condensed oligomeric type form:

in which formula:
      —$R^1$ is an aminoalkyl radical having 1 to 6 carbon atoms or a group of general formula: $H_2N$—$(CH_2)_x$ $R^2$—$(CH_2)_z$—; with $R^2$ representing O, S, —NH— or NH—$CH_2$—$CH_2$—NH— and $x \geq 2$, $z \geq 2$;
   d) at least one surfactant (S);
   e) optionally at least one biocide (D); and
   f) water;
   wherein said aqueous silicone dispersion does not contain a silane having hydrolyzable functional groups of alkoxy —OR type with R being a $C_1$-$C_{20}$ aliphatic hydrocarbon group.

3. The paint as claimed in claim 1 wherein the aqueous dispersion is in the form of an oil-in-water emulsion.

4. The paint as claimed in claim 1 wherein the water-soluble hydroxylated alkylaminosilane (C) is present up to 15% by weight relative to the total weight of the dispersion.

5. The paint as claimed in claim 1 wherein the epoxy-functionalized polyorganosiloxane (B) comprises at least one epoxy-functional radical Y, linked to the silicon via a divalent radical containing from 2 to 20 carbon atoms and possibly containing at least one heteroatom, bearing at least one epoxy unit, Y being chosen from the following radicals:

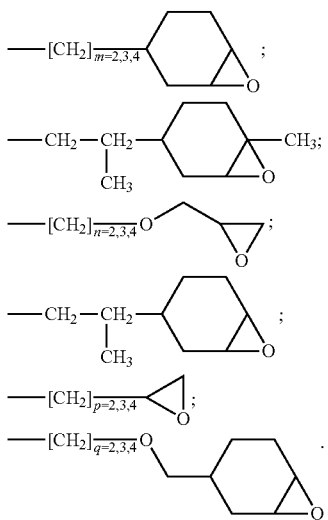

6. The paint as claimed in claim 1 wherein the epoxy-functionalized polyorganosiloxane (B) is composed of units of formula (V) or is composed of units of formula (V) and is terminated by one or more units of formula (VI):

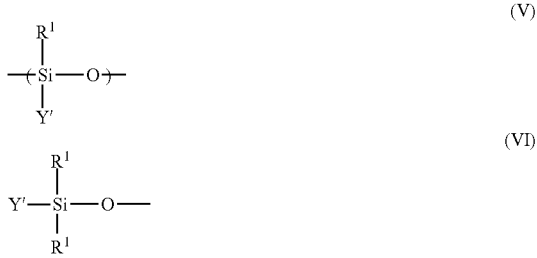

in which:
  a) the $R^1$ symbols are the same or different and represent:
    i) a linear or branched alkyl radical containing 1 to 8 carbon atoms, the alkyl radicals being methyl, ethyl, propyl or octyl;
    ii) an optionally substituted cycloalkyl radical containing between 5 and 8 cyclic carbon atoms;
    iii) an aryl radical containing between 6 and 12 carbon atoms which may be substituted; or
    iv) an arylalkyl part having an alkyl part containing between 5 and 14 carbon atoms and an aryl part containing between 6 and 12 carbon atoms, optionally substituted on the aryl part by halogens, alkyl groups and/or alkoxy groups containing 1 to 3 carbon atoms; and
  b) the Y' symbols are the same or different and represent:
    i) the group $R^1$ or
    ii) an epoxy-functional group, linked to the silicon of the polyorganosiloxane via a divalent radical containing from 2 to 20 carbon atoms and which may contain at least one heteroatom; and
    iii) at least one of the Y' symbols represents an epoxy-functional group.

7. The paint as claimed in claim 5, wherein the epoxy-functional groups of the epoxy-functionalized polyorganosiloxane (B) are chosen from the following groups:

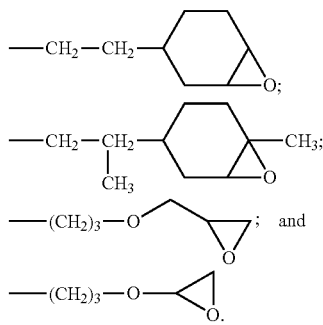

8. The paint of claim 1, wherein the water-soluble hydroxylated alkylaminosilane (C) is aminopropyltrihydroxysilane.

9. The paint of claim 1, wherein the water-soluble hydroxylated alkylaminosilane (C) is present in an amount from 0.5% to 15% by weight relative to the total weight of the aqueous silicone dispersion.

10. The paint of claim 8, wherein the aminopropyltrihydroxysilane is present in an amount from 0.5% to 15% by weight relative to the total weight of the aqueous silicone dispersion.

11. The paint of claim 1, wherein the epoxy-functionalized polyorganosiloxane (B) is cyclic, and is comprised of units of the dialkylsiloxy or alkylarylsiloxy type, and has a viscosity of around 1 to 5,000 mPa·s.

12. The paint of claim 1, wherein the surfactant is selected from the group consisting of alkali metal salts of sulfonic or alkylsulfonic aromatic hydrocarbon-based acids, polyoxyethylenated alkylphenols, and polyoxyethylenated fatty alcohols.

13. The paint of claim 1, comprising at least one biocide (D).

14. The paint of claim 1, comprising an effective amount of a polycondensation catalyst.

15. The paint of claim 1, wherein the condensable hydroxyl substituents of the polyorganosiloxane resin (A) are present in an amount of at least 0.3% by weight.

16. The paint of claim 1, wherein the condensable hydroxyl substituents of the polyorganosiloxane resin (A) are present in an amount of between 0.5% and 3% by weight.

17. The paint of claim 1, wherein the polyorganosiloxane resin (A) is a liquid polyorganosiloxane resin of the type MDT(OH), DT(OH), or mixtures thereof.

18. The paint of claim 1, wherein the polyorganosiloxane resin (A) is hydroxylated methyl silicone resin MDT(OH).

19. The paint of claim 1, wherein the epoxy-functionalized polyorganosiloxane (B) is

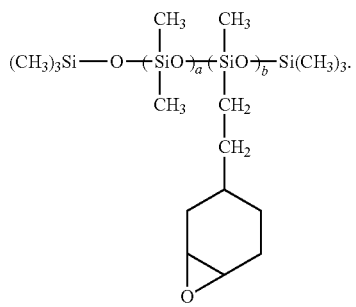

$a = 70, b = 7$

20. The paint of claim 1, wherein the water-soluble hydroxylated alkylaminosilane (C) is aqueous hydroxylate of γ-aminopropyltriethoxysilane.

21. An article coated with the paint of claim 1.

* * * * *